United States Patent
Dai et al.

(10) Patent No.: US 7,409,022 B2
(45) Date of Patent: Aug. 5, 2008

(54) SYNCHRONIZING CLOCKS IN WIRELESS PERSONAL AREA NETWORKS

(75) Inventors: Hui Dai, Boulder, CO (US); Huai-Rong Shao, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 620 days.

(21) Appl. No.: 10/956,302

(22) Filed: Oct. 1, 2004

(65) Prior Publication Data
US 2006/0072694 A1 Apr. 6, 2006

(51) Int. Cl.
*H04L 7/00* (2006.01)
(52) U.S. Cl. .................................. 375/354
(58) Field of Classification Search ............. 375/354, 375/377, 357, 369, 372, 373, 374; 370/278, 370/324, 383, 396.62, 503, 507, 512, 513, 370/520, 395.62; 713/400, 375; 455/265; 702/89
See application file for complete search history.

(56) References Cited

U.S. PATENT DOCUMENTS

| | | | |
|---|---|---|---|
| 7,200,158 B2* | 4/2007 | Gustin | 370/509 |
| 2003/0099253 A1* | 5/2003 | Kim | 370/462 |
| 2004/0120334 A1* | 6/2004 | Nation | 370/412 |
| 2004/0170187 A1* | 9/2004 | Back | 370/412 |
| 2005/0152407 A1* | 7/2005 | Pflum | 370/508 |
| 2005/0169233 A1* | 8/2005 | Kandala et al. | 370/349 |

OTHER PUBLICATIONS

D. .Mills: "Internet Time Synchronization: The Network Time Protocol", Global States and Time in Distributed Systems. IEEE Computer Society Press, 1994.

C. Liao, M. Maronosi, D. Clark: "Experience With an Adaptive Globally-Synchronizing Clock Algorithm", Eleventh Annual ACM Symposium on Parallel Algorithms and Architectures (SPAA), 1999, pp. 106-114.

J. Elson, L. Girod and D. Estrin: "Fine-Grained Network Time Synchronization using Reference Broadcasts". Proceedings of the Fifth Symposium on Operating Systems Design and Implementation (OSDI 2002), Boston, MA. Dec. 2002.

S. Ganeriwal, R. Kumar, M. B. Srivastava: "Timingsync Protocol for Sensor Networks", ACM SenSys 2003.

* cited by examiner

*Primary Examiner*—Sam K Ahn
(74) *Attorney, Agent, or Firm*—Dirk Brinkman; Clifton D. Mueller; Gene V. Vinokur

(57) ABSTRACT

A method synchronizes a transmit clock of a transmitter with a receive clock of a receiver in a wireless communications network. Times t1, t2, t3, and t4 of the transmit clock corresponding times t1', t2', t3', and t4' of the receive clock. A synchronization message is generated in a media access control layer of the transmitter at the time t1. The time t1 is inserted in the synchronization message when the synchronization message is passed from the media access layer to a physical layer at the time t2. Then, the synchronization message including the time t1 is broadcast. The synchronization message is received from the physical layer in the receiver, at which time the time t3' is obtained. The received message is passed to a media access control layer of the receiver, and the receive clock is adjusted by adding the time t1'-t3' to the current time of the receive clock.

10 Claims, 8 Drawing Sheets

SYNCHRONIZING CLOCKS IN WIRELESS PERSONAL AREA NETWORKS

FIELD OF THE INVENTION

The present invention relates generally to a method and apparatus for synchronizing clocks, and more specifically to globally synchronizing clocks of wireless personal area network devices.

BACKGROUND OF THE INVENTION

Wireless personal area networks (WPAN), as specified by the IEEE 802.15.3 and 802.1.5.4 standards, can transfer data between devices either directly or indirectly. It is expected that the devices will use cheap clocks that are subject to drift. For example, the IEEE 802.15.4 standard allows drift as large as 40 ppm, and the IEEE 802.15.3 standard allows 25 ppm of drift. In addition, the clocks of various devices may drift at different rates. Therefore, it is extremely important that the clocks of the devices are synchronized globally, for several reasons.

Often, the device use superframes, which can include one or more guaranteed time slots (GTS). In order to correctly determine boundaries of the GTS, the clocks used by the devices must be synchronized to avoid packet collisions and missed packets.

Because many WPAN devices are battery operated, global synchronization is also crucial for maintaining low duty cycles in WPANs. That is, the devices should be in 'sleep' mode most of the time, and synchronize when they are 'awake' for data transfers. If the awake times are unsynchronized, then the propagation of packets among the devices is delayed. If the devices include sensors, then it is important that sensed data includes the correct global time so that a chronology of events can be determined. Clock synchronization is also required for network authentication protocols, such as Kerberos, that generate time-stamped authentication tickets.

Clock synchronization protocols, such as NTP and SNTP, are well known for traditional networks, such as the Internet and distributed systems, see D. Mills, Z. Yang, T. Marsland (Eds.), "Internet Time Synchronization: The Network Time Protocol (NTP) Global States and Time in Distributed Systems," IEEE Computer Society Press. 1991, D. Mills: "Internet Time Synchronization: The Network Time Protocol", Global States and Time in Distributed Systems. IEEE Computer Society Press, 1994, C. Liao, M. Maronosi, D. Clark: "Experience With an Adaptive Globally-Synchronizing Clock Algorithm," Eleventh Annual ACM Symposium on Parallel Algorithms and Architectures (SPAA), 1999, pp. 106-114, K. Arvind: "Probabilistic Clock Synchronization in Distributed Systems," IEEE Trans. parallel and Distributed Systems, vol. 5, no. 5, pp. 475-487, May 1994, "Simple Network Time Protocol (SNTP)," IETF RFC 2030, and the IEEE 802.15.4-2003 standard. However, those complex protocols are inappropriate for WPANs due to their high resource requirements, such as power, processing, and network bandwidth.

Several clock synchronization protocols are described for wireless sensor networks, J. Elson, L. Girod and D. Estrin: "Fine-Grained Network Time Synchronization using Reference Broadcasts," Proceedings of the Fifth Symposium on Operating Systems Design and Implementation, December 2002. Elson et. al. describe reference broadcast synchronization (RBS), where devices periodically broadcast beacon messages. The arrival times of the beacon messages serve as a reference point to determine drift in the clocks of the devices. That method is also resource demanding because a large number of messages are required to achieve accurate clock synchronization.

Other clock synchronization techniques are described in U.S. Pat. No. 4,882,739, November 1989, Richard et al., U.S. Pat. No. 6,678,510, January 2004, Syrjarinne et al., U.S. Pat. No. 5,408,506, April 1995, Mincher et al., U.S. Pat. No. 6,680,932, January 2004, Hsuan et al., U.S. Pat. No. 6,539,004, March 2003, Sawyer, and U.S. Pat. No. 6,674,730, January 2004, Moerder et al.

SUMMARY OF THE INVENTION

The invention provides a method for globally synchronizing clocks of devices in a wireless personal area network (WPAN). Each device has an independent clock providing time reading. The invention corrects the time offset due to the clock drift on each device.

DETAILED DESCRIPTION OF THE PREFERRED EMBODIMENT

Figure 1:
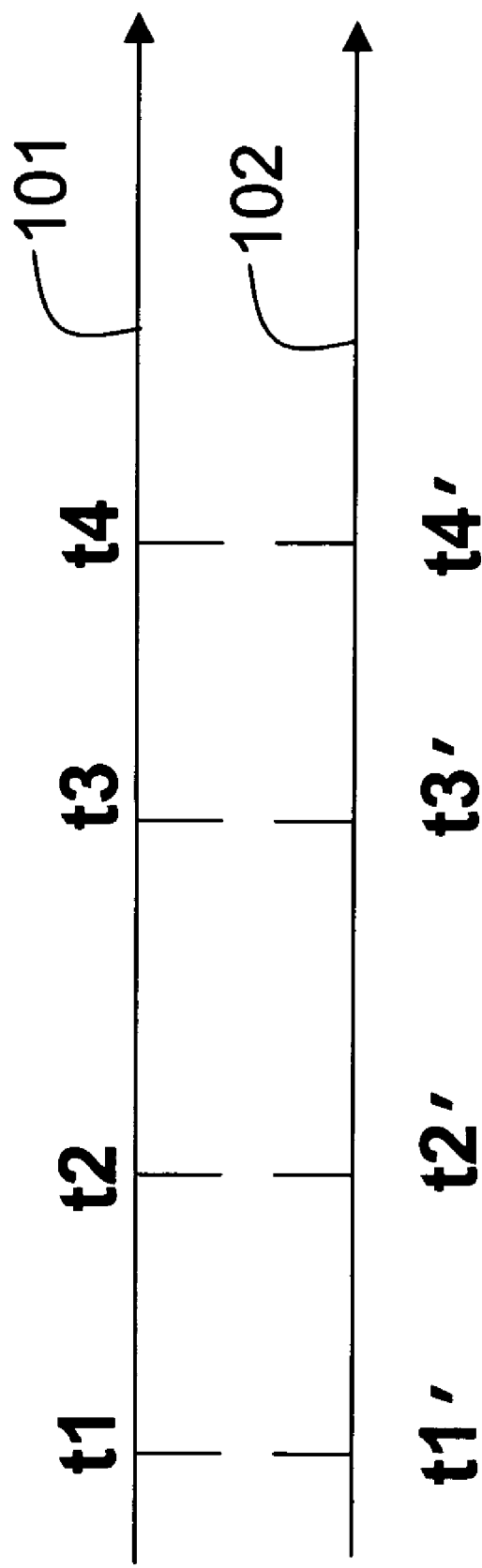
FIG. 1 is a timing diagram of clock in wireless devices according to the invention.

As shown in FIG. 1, for the purpose of synchronizing clocks 101-102 according to our invention, the following times are important. A time t1 of a clock 101 of a transmitter indicates when a synchronization message is generated in a media access control (MAC) layer of the transmitter. The message first appears on a physical (PHY) layer at time t2. The message is received at time t3, and reaches the MAC layer of the receiver at time t4. The corresponding times of a clock 102 in the receiver are t1', t2', t3', and t4'.

If there is neither a propagation delay nor a processing delay, the clock of the receiver could be set to time t1 at time t4'. That is to say, the receiver sets its clock from t4' to t1 by adding a drift value (t1−t4'). However, if there is a propagation delay and a processing delay, then the receiver's clock should be set to t4 by adding a drift value (t4−t4'). A difference between the two drift values ((t4−t4')−(t1−t4')) is t4−t1.

Thus, we have a value t4−t1=(t3−t2)+(t2−t1)+(t4−t3)). This value includes two main parts. The first part (t3−t2) is the propagation delay and the second part (t2−t1)+t4−t3 is the processing delay.

The propagation delay is the time it takes the message to pass through the channel, which is (t3−t2). The propagation delay corresponds to the distance between the devices, which is constant if the devices are fixed in place. The propagation delay is small and relatively easier to measure compared with the processing delay. According to the IEEE 802.15.4 standard, the personal operating space (POS) of a device in a WPAN is limited to be within ten meters. Thus, the propagation delay is less than 33.33 ns. The propagation delay between closely neighboring devices can be ignored.

The processing delay includes two parts, i.e., an access delay and a receive delay. The access delay (t2−t1) is the time required to pass the message from the MAC layer to the PHY layer at the transmitter, and the receive delay is the time required to pass the message from the PHY layer to the MAC layer at the receiver. To minimize the access delay, the times t1 and t2 should be the same. To minimize the receive delay, the times t4 and t3 should be the same. In prior art methods, the time t1 is added to the message when the message is generated at the MAC layer. This makes the time t1 an inaccurate estimate of the time t2. Our invention improves the estimate of the actual time t2 when a synchronization message appears at the physical layer.

Figure 2:
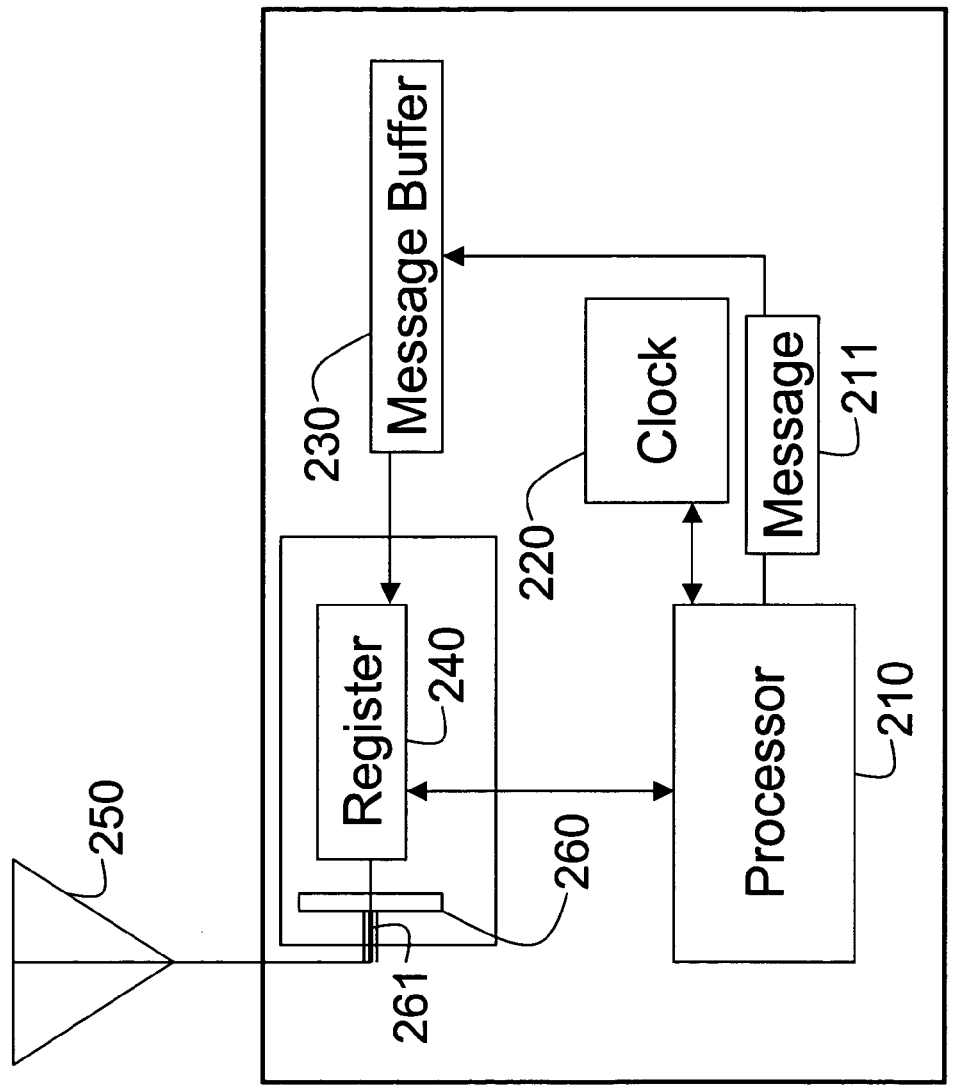
FIG. 2 is a block diagram of a transmitter according to the invention.

FIG. 2 shows a transmitter 200 according to our invention. The transmitter can be a designated "time server" device responsible for synchronizing other devices in the network. The transmitter includes a processor 210, a clock 220, a message buffer 230, a shift register 240, a radio interface 260 and an antenna 250 connected to a radio interface 260. Note, the clock can be read, and written.

For the purpose of this invention the physical layer includes the message buffer, the shift register, the radio interface, the antenna, and any other RF components 261 between the shift register and the antenna.

In a first embodiment of the invention, a synchronization message 211 is generated at the MAC layer by the processor 210, and the synchronization message 211 is stored in the message buffer 230. The message 211 includes a preamble, a packet delimiter, and payload. This is the standard structure defined for a packet at the PHY layer. From the message buffer, the message is shifted, one byte at the time through the shift register 240 to the antenna 250 via the radio interface 260. The synchronization message can be sent periodically at time interval $T_s$. That is the devices can synchronize themselves at a rate of $1/T_s$.

To improve the synchronization accuracy according to the invention, the time t1 is inserted into the message 211 as the message is transmitted via the physical layer. This can be done by generating an interrupt to obtain the time t1 when the message is passed through the shift register connected to the antenna 250. If the time t1 is placed near the end of the message, most of the message will already be in the physical layer at the time is inserted in the message. This way, the time t1 is substantially equal to the time t2, i.e., the times are effectively t1≅t2. Alternatively, the time t1 can be estimated, as described below.

Figure 3:
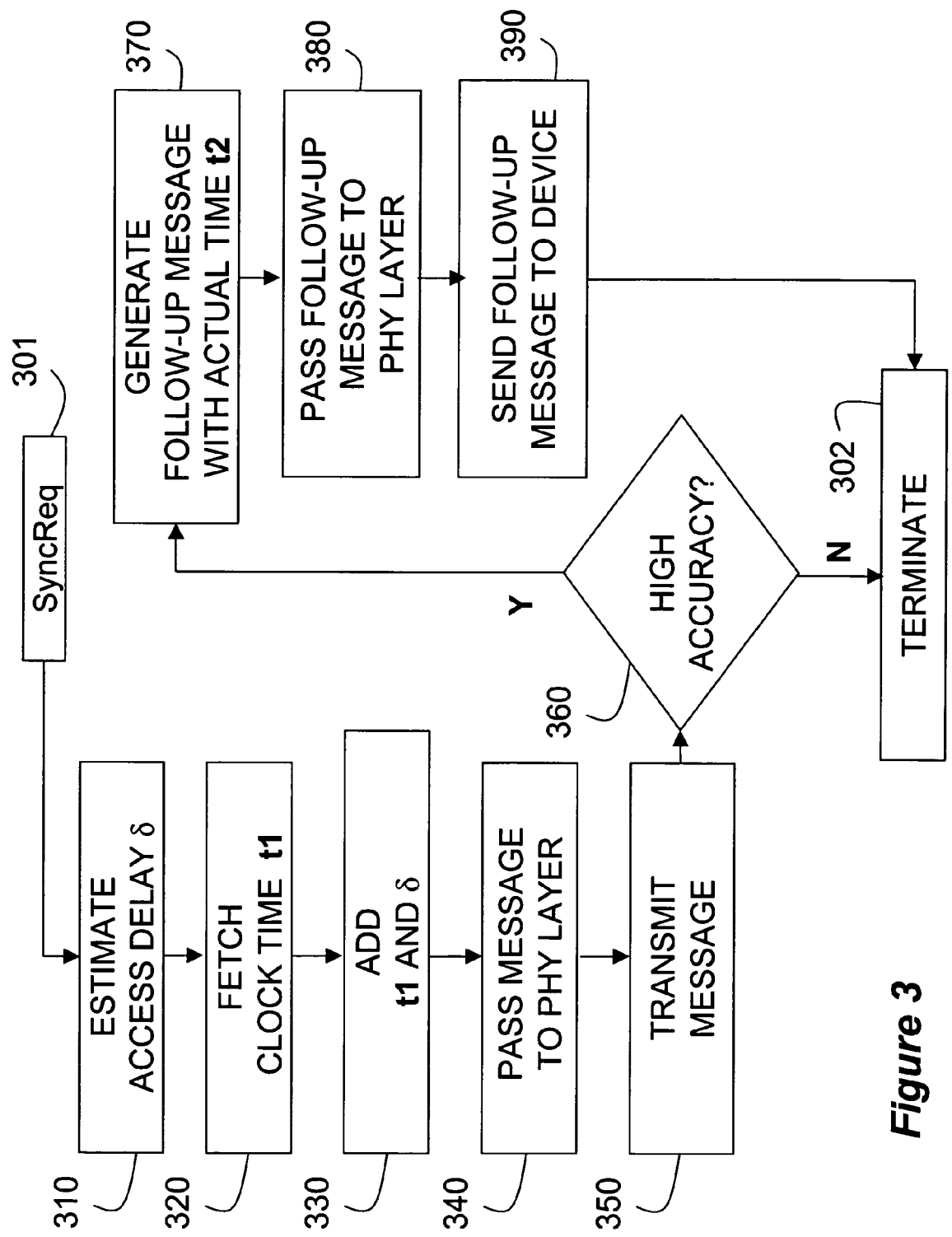
FIG. 3 is a flow diagram of a method for minimizing an access delay time in a transmitter according to the invention.

FIG. 3 shows how the access delay can be further minimized in an alternative embodiment. In response to a synchronization request (SyncReq) 301, the transmitter estimates 310 an access delay δ. Then, the clock time t1 can be obtained 320 at the MAC layer. We add 330 t1 to the access delay δ, pass 340 the message from the MAC layer to the PHY layer, and transmit 350 the message to the receiver. In this case, the time δ+t1≅t2, to again achieve the desired result.

After transmission 350 is finished, the transmitter can then check 360 whether high accuracy synchronization is required. If no, then the process is terminated 302. Otherwise, if yes, a follow-up message is generated 370 with the actual time t2 of the initial message, which is passed 380 to the PHY layer, transmitted 390 to the device, and the process terminated 302. In this case, the receiver can adjust its clock later by compensating according to the actual time t2 of the initial message, as sent in the follow-up message.

Figure 4:
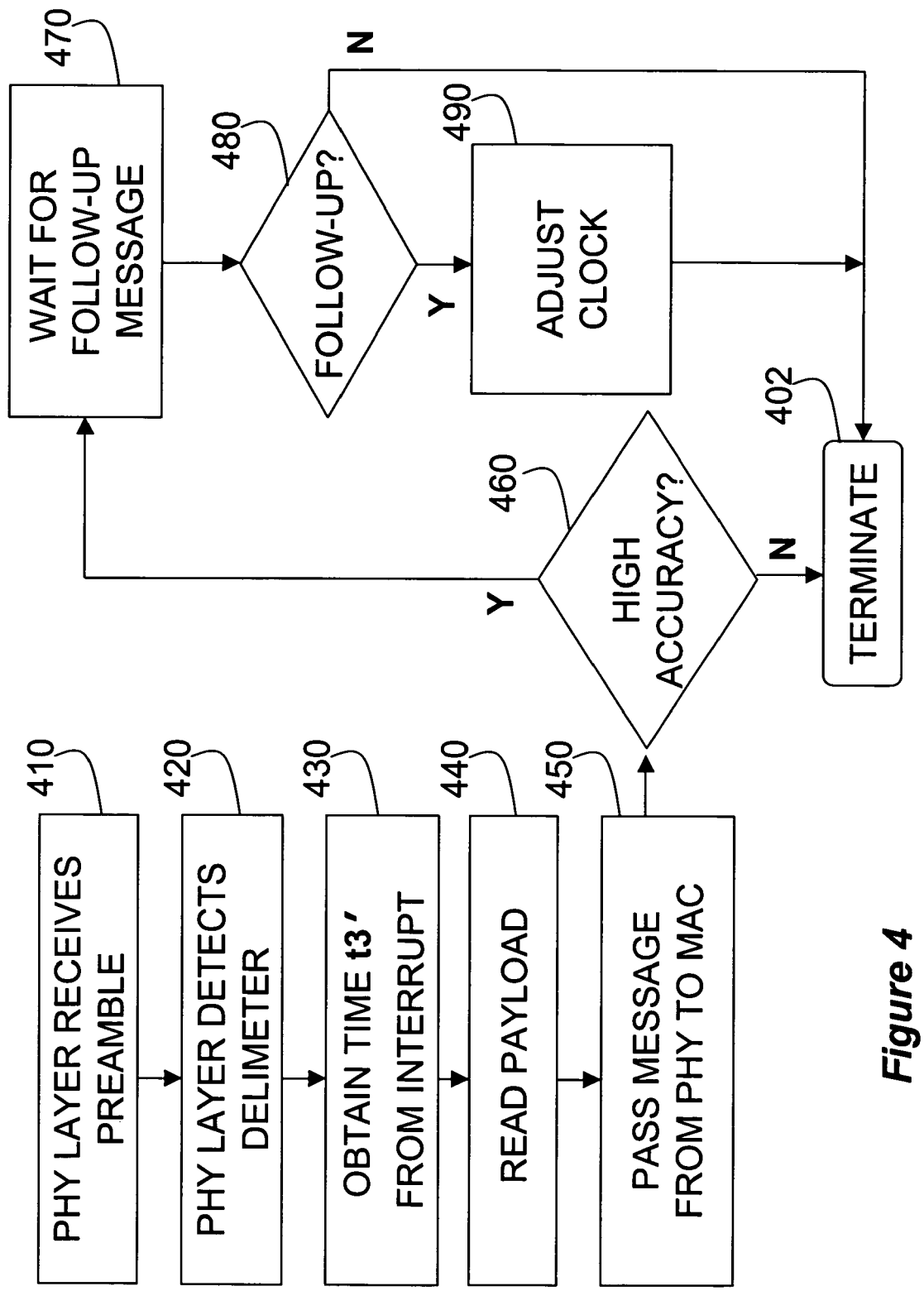
FIG. 4 is a flow diagram of a method for minimizing an access delay time in a receiver according to the invention.

FIG. 4 shows the corresponding processing at the receiver. The preamble is received 410, and the packet delimiter is detected 420. At that time, an interrupt is generated to obtain 430 the clock time t3'. This time is used as the receive time because the next byte read 440 is payload. Then, the message is passed 450 to the MAC layer. The receiver adjusts its clock by adding t1−t3' to the current time of the receive clock.

The receiver can then check 460 whether high accuracy synchronization is required. If not, then terminate 402 the process. Otherwise, if yes, wait 470 for the follow-up message. If the follow-up message is not received 480 in a predetermined time, then terminate 402. Otherwise, if yes, adjust clock 490 again by adding t2−t1 to the current time of the receive clock.

In the above description, the time stamp is captured on the same byte/symbol offset in the packet. For example, all the time stamps can be fetched at the delimiter of the synchronization or follow-up message. We provide another extension, which allows the sender and receiver to capture the time stamp at different byte/symbol boundary offset in the message.

In the synchronization message sent from the transmitter to the receiver, the transmitter includes the captured offset relative to the beginning of the packet. And the receiver can compensate for offset later.

Figure 5:
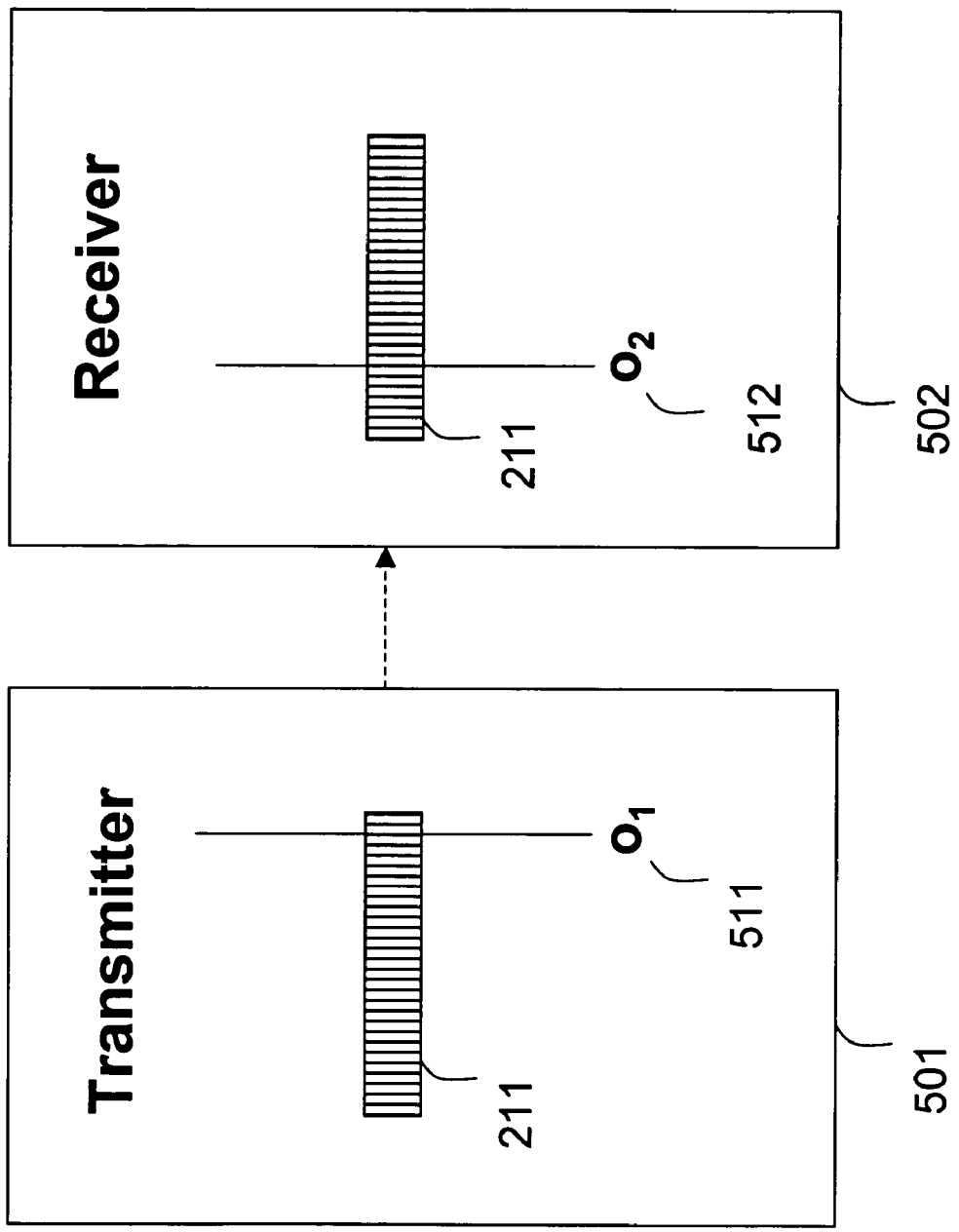
FIG. 5 is a block diagram of radio interfaces according to the invention.

As shown in FIG. 5, the times inserted in the synchronization messages 211 generated in the transmitter 501 are acquired at the PHY layer at some time that corresponds to a byte offset $o_1$ 511. This depends on how the transmitter is constructed and operated, which can be implementation and manufacturer specific. The time acquired in the PHY layer of the receiver 502 corresponds to some byte offset $o_2$ 512. Because the construction and operation of the transmitter and receiver can be independent of each other, these two offsets are not necessarily the same. If the data rate is k bytes/second, then the time offset between the clocks of the transmitter and the receiver be compensated by adding $(o_2-o_1)/k$ to the current time of the receive clock, in an alternative embodiment of the invention. The value $o_1$ can be inserted in the synchronization messages by the transmitter. This value is constant, and only needs to be transmitted one time.

Figure 6:
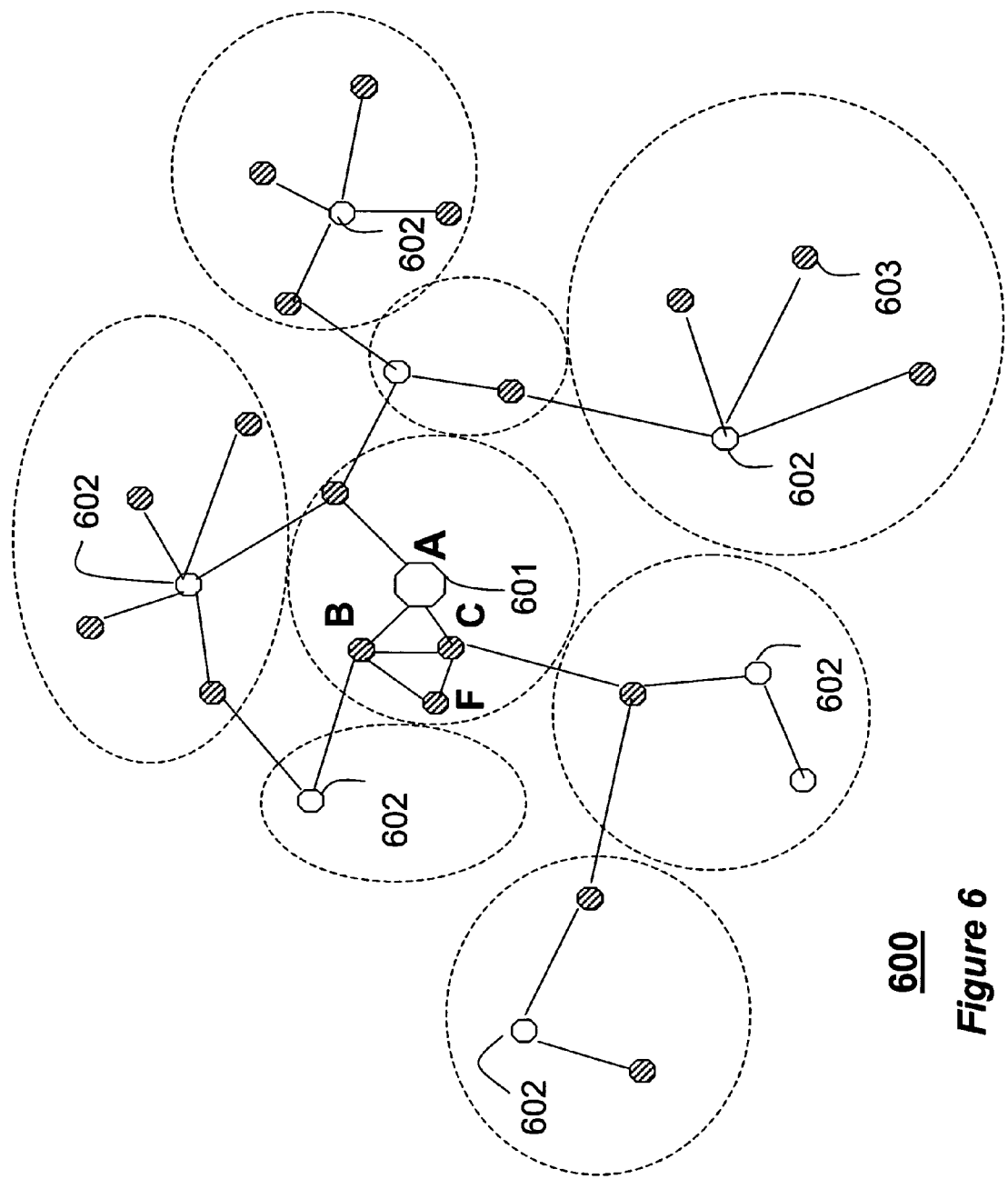
FIG. 6 is a block diagram of a wireless personal area network devices according to the invention.

As shown in FIG. 6, a WPAN 600 of devices typically includes a single WPAN coordinator device 601, multiple coordinators devices 602, and end devices 603. Synchronization in this WPAN can be achieved by propagating synchronization messages though the network via multiple hops. The synchronization messages can be originated by any device in the network. Multi-hop time synchronization among devices is difficult because each hop introduces additional unknown delays.

Figure 7:
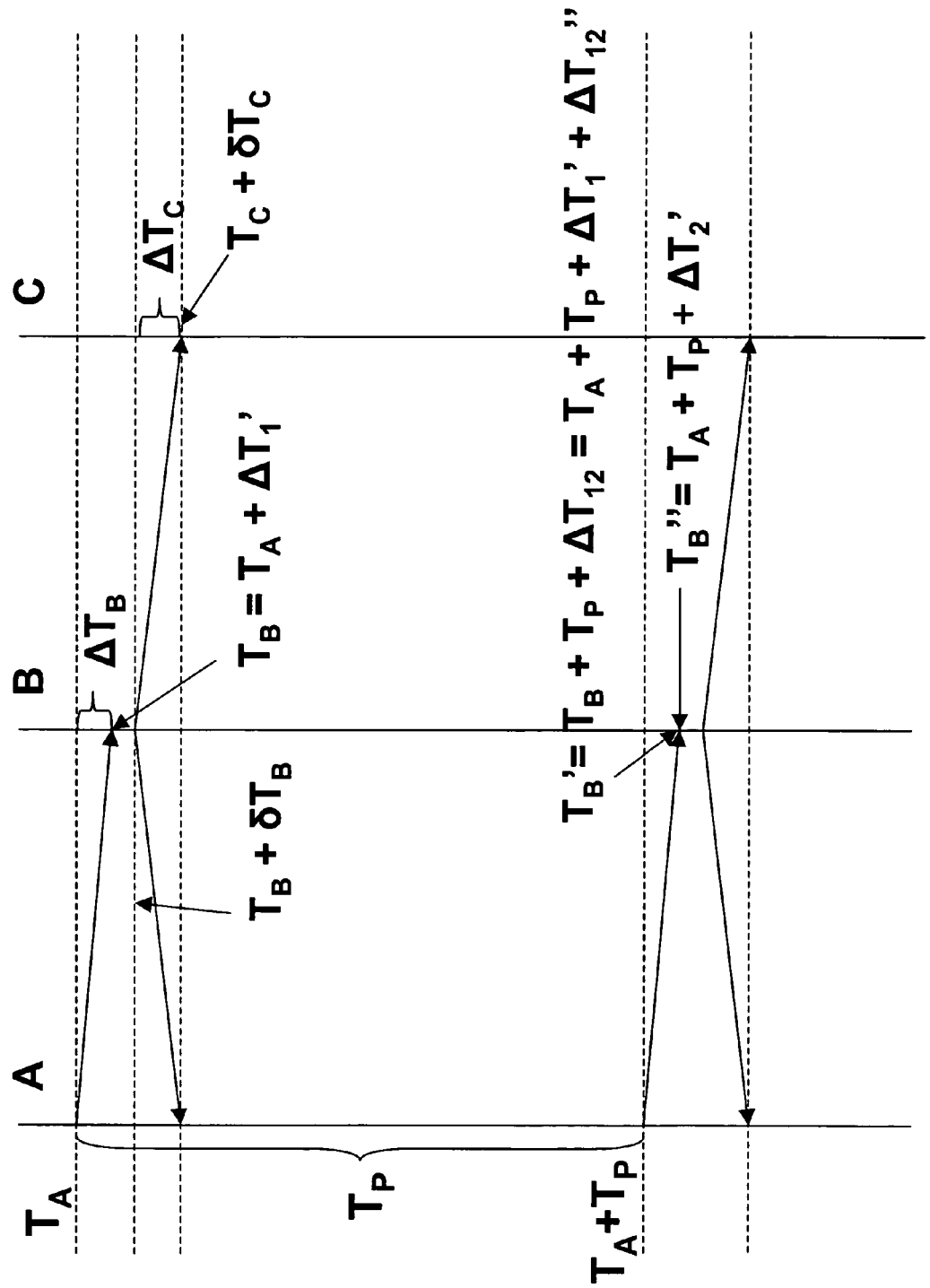
FIG. 7 is a timing diagram of clock drift error estimation and normalization according to the invention.

FIG. 7 shows clock drift error estimation and normalization between clocks of devices A and B in FIG. 6. Device A broadcasts periodically at the time intervals $T_s$ a group of synchronization messages. The time interval between the synchronization messages in the group is $T_P$, such that $T_P<<T_s$.

At time $T_A$, device A broadcasts a first synchronization message to device B. A total time synchronization error between the clocks of devices A and B is $\Delta T_1'$. Therefore, device B sets its clock to $T_B$, which is equal to $T_A + \Delta T_1'$. A second synchronization message is broadcasted by device A at time $T_A+T_P$. We assume the time synchronization error for the second round of time synchronization is $\Delta T_2'$. Thus, when the message arrives at device B, device B estimates a time $T_B''$ as $T_B''=T_A+T_P+\Delta T_2'$, while the time at the clock of device B is $T_B'=T_B+T_P+\Delta T_{12}''=T_A+T_P+\Delta T_1'+\Delta T_{12}''$.

Here $\Delta T_{12}''$ is an offset generated during the time interval period $T_P$. The offset is only affected by the related clock offset on A and B. From above, we have $\Delta_{12}=T_B'-T_B''=\Delta T_{12}''+\Delta T_1'-\Delta T_2'$, where $\Delta_{12}$ is a difference between the local clock reading and a clock reading to be set after synchronization.

From the above equations, it is clear that it contains two parts, i.e. $\Delta T_{12}''$ and $\Delta T_1'-\Delta T_2'$. The offset $\Delta T_{12}''$ is the relative clock offset during the synchronization period. This offset is related only to clocks of the different devices. A difference between two synchronization error is $\Delta T_1'-\Delta T_2'$.

For N time synchronization messages, we have $$\Delta_{23}=\Delta T_{23}''+\Delta T_2'-\Delta T_3'$$

$$\Delta_{34}=\Delta T_{34}''+\Delta T_3'-\Delta T_4'$$

$$\ldots$$

$$\Delta_{N-1,N}=\Delta T_{N-1,N}''+\Delta T_{N-1}'-\Delta T_N'.$$

Thus, we have $$\Sigma\Delta_{i,i+1}=\Sigma\Delta T_{i,i+1}''+\Delta T_1'-\Delta T_N' (1\leq i<N).$$

By averaging the result, we obtain $$\Sigma\Delta_{i,i+1}/N=\Sigma\Delta T_{i,i+1}''/N+(\Delta T_1'-\Delta T_N')/N (1\leq i<N)$$

Because $\Delta T_{i,i+1}''$ is related only to the offset of the clock, it can be treated as a constant $\Delta T''$.

Thus, we obtain $$\Sigma\Delta_{i,i+1}/N=\Delta T''+(\Delta T_1'-\Delta T_N')/N (1\leq i<N).$$

From the above equation, we can effectively estimate the relative offset $\Delta T''$ as N increases, assuming that $T_P$ is relatively small, e.g., less than 20 ms.

Therefore, we broadcast periodically K groups of synchronization messages at each time interval $T_s$ so that the estimation of $\Delta T''$ is more accurate. After we estimate $\Delta T''$, we then infer the distribution of $\Delta T_1'$ via a distribution of $\Sigma_{i,i+1}\Delta_{i,i+1}$.

We analyze the error estimation using a normal distribution. However other distributions can also be used.

We have $$\Sigma\Delta_{i,i+1}=\Sigma\Delta T_{i,i+1}''+\Delta T_1'-\Delta T_N' (1\leq i<N), \text{ and}$$

for K repetitions, we have $$\Sigma_m(\Sigma\Delta_{i,i+1}-\Sigma\Delta T_{i,i+1}'')=\Sigma_m(\Delta T_{1m}'-\Delta T_{Nm}') (1\leq i<N, 1\leq m\leq K).$$

The value $\Sigma_m(\Sigma\Delta_{i,i+1}-\Sigma\Delta T_{i,i+1}'')$ can be determined with the estimation of $\Delta T''$. According to the above analysis, $\Delta T_{1m}'$ follows the normal distribution with a mean $\mu$ and variance $\sigma^2$. If $\Delta T_{1m}'$ and $\Delta T_{nm}'$ have a normal distribution and are independent of each other, then the difference has a mean of $\mu-\mu=0$, and a variance of their difference is $2\sigma^2$.

If the difference $\Delta T_{ij}$ is a constant $\Delta T''$, then we obtain the value of $\sigma$ by approximating the value of $\Sigma_m(\Sigma\Delta_{i,i+1}-\Delta T_{i,i+1}'')$ from past measurements.

Figure 8:
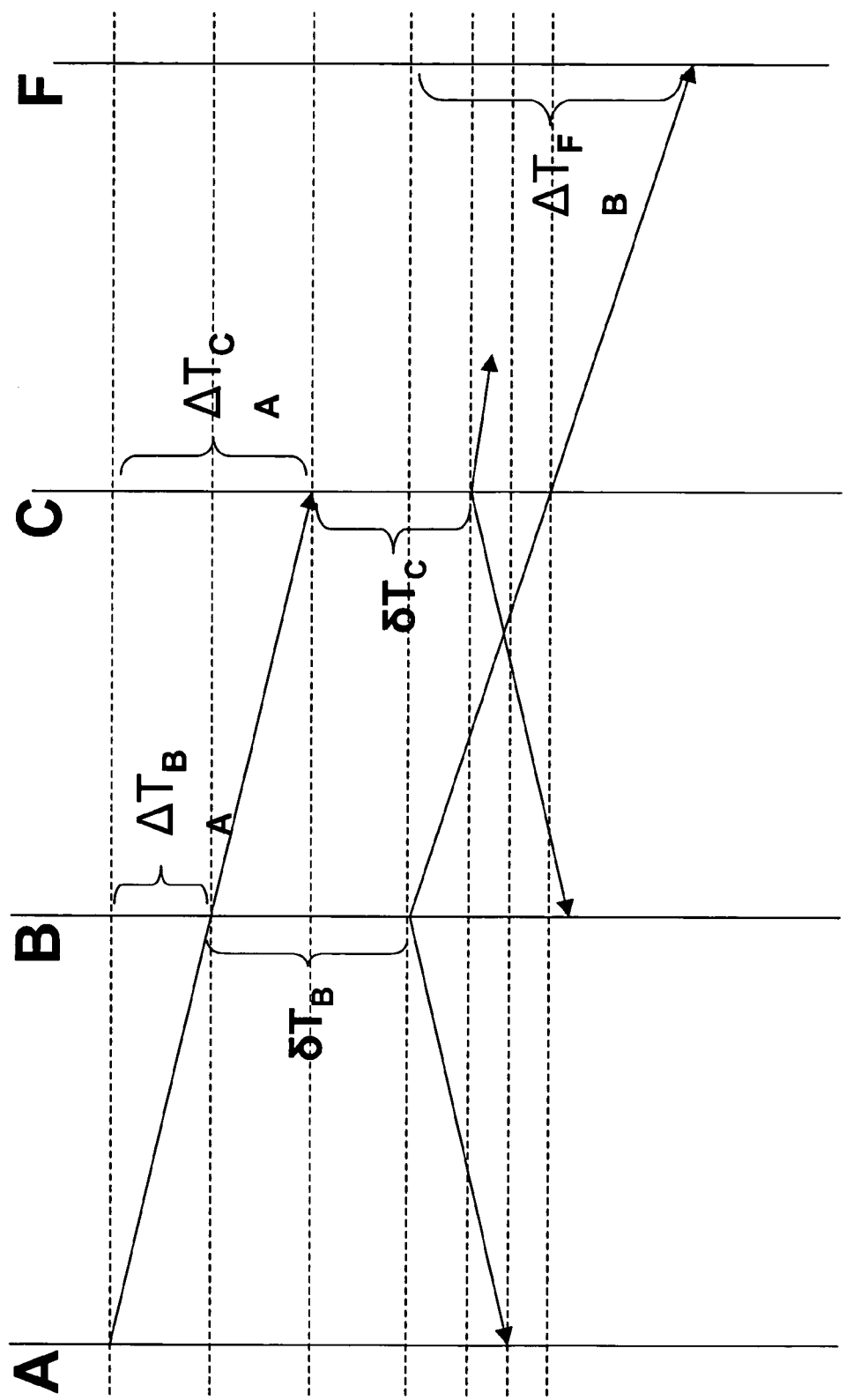
FIG. 8 is a timing diagram of multi-hop time synchronization according to the invention.

FIG. 8 shows neighboring time synchronization between devices A, B, C, and F in FIG. 6. Device A broadcasts a synchronization message at time $T_A$. Devices B and C receives this message at different times because their distances to A are different. At time $T_A+\Delta T_{BA}+\delta T_B$, device B rebroadcasts the message to neighboring devices C and F, where $\Delta T_{BA}$ is the amount of clock drift between the clocks of device A and B.

In this invention, a rate of drift, i.e., $\Delta T_{BA}/T_P$, between the clocks of the devices A and B is included in time synchronization messages, where $T_P$ is the time interval between sending synchronization messages. This allows a device to synchronize to 'hidden' devices. For example, in the FIG. 6, device F can receive the synchronization message from both device B and C. If device C did not receive synchronization messages from device B, for any reason, then device C can still synchronize its clock to the clock of device B based on the message received from device F, because the offset of the clock of device B, relative offset to the clock of device A, is contained in messages broadcast by device F. The message also includes a sequence number of the original synchronization message to identify each round of synchronization.

The following paragraphs describe the method of synchronizing clocks of devices in a personal operating space (POS) after receiving the synchronization message from a time service provider. Assume device B and C are both synchronized to device A. After device B receives the synchronization message from device A, device B rebroadcasts the message to the devices F and C in its POS. On receiving such a synchronization message, device F and device C process the message differently.

When device C receives the message from device B, device C obtains the clock drift rate $\Delta T_{BA}/T_P$ contained in the synchronization message received from device B. Assume the clock drift rate at device C is $\Delta T_{CA}/T_P$. The drift rate between device B and device C can then be calculated as $T_P*(\Delta T_{CA}/T_P-\Delta T_{BA}/T_P)=\Delta T_{CA}-\Delta T_{BA}$.

Knowing the drift rate allows implicit synchronization of the clock of device C with the clock of device B. Also, the clock drift rate between device C and device B can be calculated as $$(\Delta T_{CA}/T_P)/(\Delta T_{BA}/T_P)=\Delta T_{CA}/\Delta T_{BA}.$$

This clock drift rate is used to estimate the time of the clock in device B.

When device F receives the synchronization message from device B, device F determines the time synchronization error between device B and device F using the procedure described above. The clock drift rate between device B and device F is $\Delta T_{FB}$. By adding the local error, we obtain the clock offset between device C and device A as $\Delta T_{FB}+\Delta T_{BA}$.

In the method according to the invention, each device maintains a table of timestamps of received synchronization messages, the corresponding local times. Our method allows the device to track drift rates of other devices, and determine an implicit time reference.

Although the invention was described herein with reference to a WPAN, the invention may be embodied in a variety of environments comprising a wireless link including wireless sensor network.

The embodiments disclosed above may be combined with one another. The invention may be embodied in other specific forms without departing from its spirit or essential characteristics. The described embodiment is to be considered in all respects only as illustrative and not as restrictive and the scope of the claim of the invention is, therefore, indicated by the appended claims rather than by the foregoing descriptions. All changes which come within the meaning and range of equivalency of the claims are to be embraced within their scope.

We claim:

1. A method for synchronizing a transmit clock of a transmitter with a receive clock of a receiver in a wireless communications network, wherein, for the transmit clock, a time t1 is when a synchronization message is in a MAC layer of the transmitter, a time t2 is when the synchronization message is in a PHY layer of the transmitter, a time t3 is when the synchronization message is in a PHY layer of the receiver, and a time t4 is when the synchronization message is in a MAC layer of the receiver, and corresponding times for the receive clock are t1', t2', t3', and t4', respectively, comprising:
  generating the synchronization message in the MAC layer of the transmitter at the time t1;
  inserting the time t1 in the synchronization message when the synchronization message is in the MAC layer of the transmitter;
  passing the message from the MAC layer to the PHY layer;
  adding an access delay δ to the time t1, the access delay being an estimate of a delay required to pass the synchronization message from the MAC layer to the PHY layer; and
  broadcasting the synchronization message to the receiver.

2. The method of claim 1, further comprising
  storing the synchronization message in a message buffer of the PHY layer of the transmitter; and
  shifting the synchronization message one byte at a time through a shift register of the physical layer.

3. The method of claim 1, further comprising:
  receiving the synchronization message from the PHY layer in the receiver;
  acquiring the time t3';
  passing the received synchronization message from the PHY layer to the MAC layer of the receiver; and
  adjusting the receive clock by adding a time offset t1−t3' to a current time of the receive clock.

4. The method of claim 1 further comprising:
  generating a follow-up message in the MAC layer of the transmitter;
  inserting the actual time t2 in the follow-up message;
  broadcasting the follow-up message including the time t2;
  receiving the follow-up message in the MAC layer of the receiver; and
  adjusting the receive clock by adding t2−t1 to the current time of the receive clock.

5. The method of claim 1 further comprising:
  broadcasting a plurality of the synchronization message, each of the plurality of synchronization messages separated by time intervals $T_p$, and each of the plurality of synchronization messages including a corresponding time t1; and
  estimating a time synchronization error between the transmit clock and the receive clock from the plurality of times t1.

6. The method of claim 5, in which the plurality of the synchronization messages are broadcast at time intervals $T_s$ such that $T_p \ll T_s$.

7. The method of claim 5, in which a distribution of the time synchronization error is determined.

8. The method of claim 7, in which the distribution is normal.

9. The method of claim 1, further comprising:
  determining a rate of drift between the transmit clock and the receive clock; and
  adjusting the receive clock periodically according to the drift rate.

10. The method of claim 1, further comprising:
  acquiring the time t1 in the transmitter at a time corresponds to a byte offset $o_2$ in the synchronization message;
  acquiring the time t3' in the receiver at a time corresponding to a byte offset $o_2$ in the synchronization message; and
  adjusting the receive clock by adding $(o_2-o_1)/k$ to the current time of the receive clock, where k is a byte rate at which the synchronization message is broadcast.

* * * * *